(12) United States Patent
Menezes

(10) Patent No.: US 6,505,934 B1
(45) Date of Patent: Jan. 14, 2003

(54) PROGRESSIVE ADDITION LENSES WITH PRISM POWER ADDED TO IMPROVE WEARER COMFORT

(75) Inventor: Edgar V. Menezes, Roanoke, VA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 61 days.

(21) Appl. No.: 09/844,910

(22) Filed: Apr. 27, 2001

(51) Int. Cl.[7] .............. G02C 7/06; G02C 7/02
(52) U.S. Cl. ............... 351/169; 351/175; 351/177
(58) Field of Search ................. 351/169, 175, 351/177

(56) References Cited

U.S. PATENT DOCUMENTS

| | | | |
|---|---|---|---|
| 1,393,853 A | 10/1921 | Tillyer | 351/175 |
| 2,442,849 A | 6/1948 | Glazer | 351/175 |
| 4,315,673 A | 2/1982 | Guilion et al. | 351/169 |
| 4,606,626 A | 8/1986 | Shinohara | 351/169 |
| 5,210,553 A * | 5/1993 | Barth et al. | 351/169 |
| 5,455,642 A * | 10/1995 | Kato | 351/169 |
| 5,689,324 A | 11/1997 | Lossman et al. | 351/169 |
| 6,019,470 A * | 2/2000 | Mukaiyama et al. | 351/169 |

* cited by examiner

Primary Examiner—Jordan M. Schwartz

(57) ABSTRACT

The present invention provides progressive addition lenses into which vertical prism power is added. The resulting lens exhibits an improved image quality in comparison to conventional progressive addition lenses.

12 Claims, 3 Drawing Sheets

PROGRESSIVE ADDITION LENSES WITH PRISM POWER ADDED TO IMPROVE WEARER COMFORT

FIELD OF THE INVENTION

The present invention relates to multifocal ophthalmic lenses. In particular, the invention is directed to progressive addition lenses in which prism power is added resulting in improved image quality.

BACKGROUND OF THE INVENTION

The use of ophthalmic lenses for the correction of ametropia is well known. For example, multifocal lenses, such as progressive addition lenses ("PALs"), are used for the treatment of presbyopia. Typically, a PAL provides distance, intermediate, and near vision zones in a gradual, continuous progression of increasing dioptric power. PALs are appealing to the wearer because the lenses are free of the visible ledges between the zones of differing optical power that are found in other types of multifocal lenses, such as bifocals and trifocals.

However, inherent in PALs are changes in image location, magnification, and blur upon movement of the wearer's head and eyes. These problems with image quality and movement make it difficult for the PAL wearer to adapt to and use the lenses. Known methods to reduce these image problems include spreading the unwanted astigmatism, or astigmatism introduced by the lens, into the periphery of the lens, lengthening of the channel to provide a more gradual increase in power, and using more than one progressive surface to form the lens. These methods are disadvantageous in that they do not offset the effect on image quality of unprescribed prism power, or prism power introduced or caused by one or more of the lens surfaces, resulting in image blurring, distorting, and shifting for the lens wearer. Thus, a need exists for a PAL that overcomes this disadvantage.

DESCRIPTION OF THE INVENTION AND ITS PREFERRED EMBODIMENTS

Figure 1:
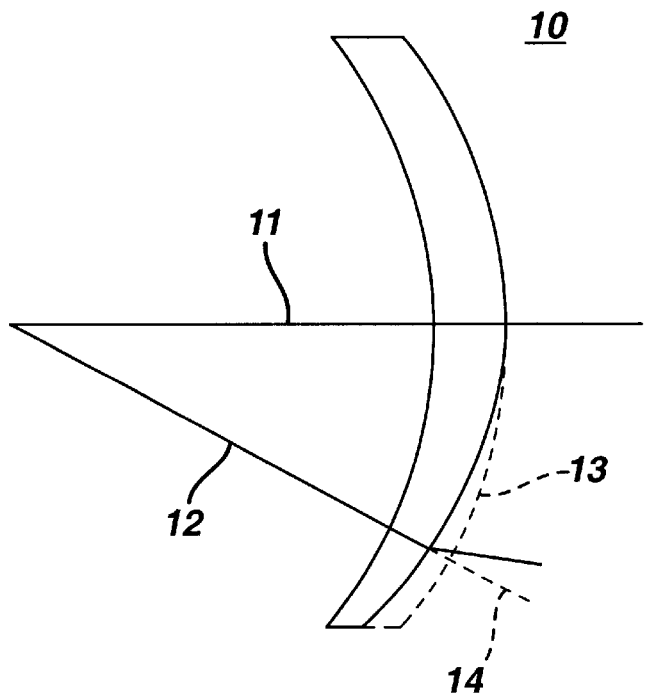
FIG. 1 is a magnified, cross-sectional view of a prior art progressive addition lens.

The present invention provides lenses, as well as methods for their design and production, in which prism power is introduced into the lens. This added prism power overcomes, in whole or in part, the adverse image quality effect of the lens' unprescribed prism power.

In one embodiment, the invention provides a progressive addition lens comprising, consisting essentially of, and consisting of an add power, a near vision zone vertical prism having a power and a base, and a vertical prism having a power and a base added to substantially the whole lens, wherein the added vertical prism base is opposite in direction to the near vision zone vertical prism base and the added vertical prism power is equal to about 0.25 percent of the add power.

By "progressive addition lens" is meant a lens having at least one progressive addition surface. A "progressive addition surface" is a continuous, aspheric surface having distance and near viewing or vision zones, and a zone of increasing dioptric power connecting the distance and near zones. By "add power" is meant the amount of dioptric power difference between the near and distance vision zones of the progressive addition lens.

In another embodiment, the invention provides a pair of progressive addition lens, comprising, consisting essentially of, and consisting of: a.) a first lens comprising, consisting essentially of, and consisting of a first add power, a first near vision zone vertical prism having a power and a base, and a first vertical prism having a power and a base added to substantially the whole lens; b.) a second lens comprising, consisting essentially of, and consisting of a second add power, a second near vision zone vertical prism having a power and a base, and a second vertical prism having a power and a base added to substantially the whole lens; wherein the first and second added prism base each are opposite in direction to the near vision zone vertical prism base to which it is added, the added vertical prisms each is equal to about 0.25 percent of the add power of the lens to which it is added, and there is a difference between the vertical prism at any point on the first lens and a corresponding point on the second lens equal to or less than about 0.5 diopters.

It is a discovery of the invention that a the continuous change in power of the progressive addition lens from the distance to the near vision zone introduces vertical prism into the lens, the introduced prism varying in power corresponding to the power change from the lens' fitting point to the near vision zone. The power and direction of this vertical prism is dependent on the distance and near vision zone spherical powers of the lens.

Typically, the prism will be either base up or base down. By "base up" is meant that the base of the prism lies in the direction of 90 degrees relative to the lens surface. By "base down" is meant that the base of the prism lies in the direction of 270 degrees relative to the lens surface. For positive spherical powers in the near vision zone, the vertical prism will be a base up prism and for a negative spherical power, the prism will be a base down prism. The effect of the base up prism is to curve and elongate the image being viewed by the lens wearer. Base down prism results in a curving of the image and a shifting upwardly of the image. Thus, the unprescribed prism inherent in a progressive addition lens near vision zone results in a reduced image quality for the lens wearer.

It is another discovery of the image that the image quality of a progressive addition lens may be improved by addition of vertical prism to substantially the entire lens. The added prism is of a base direction that is opposite to that of the unprescribed vertical prism inherent in the near vision zone of the lens. Because vertical prism is added to substantially the entire lens, the added prism power must be limited to that amount that the lens wearer can tolerate without a substantial reduction of visual acuity in the distance viewing zone. Typically, more than one line loss of visual acuity, as measured using a visual acuity chart, is not well tolerated by the lens wearer. Therefore, preferably the amount of added vertical prism power is equal to about 0.25 percent of the lens' add power. More preferably, in a pair of lenses to be worn, the amount of added prism power is about equal in both lenses worn by the lens wearer. Most preferably, the amount of prism added to a pair of lenses is such that the vertical prism at any point on the right eye lens is different from that of corresponding point on the left eye lens by an amount equal to or less than about 0.5 diopters.

The lenses of the invention may be fabricated by any convenient means and constructed of any known material suitable for production of ophthalmic lenses. Suitable materials include, without limitation, polycarbonate, ally diglycol, polymethacrylate, and the like. Such materials are either commercially available or methods for their production are known. Further, the lenses may be produced by any conventional lens fabrication technique including, without limitation grinding, whole lens casting, molding, thermoforming, laminating, surface casting, or combinations thereof. Casting may be carried out by any means, but preferably is performed by surface casting including, without limitation, as disclosed in U.S. Pat. Nos. 5,147,585, 5,178,800, 5,219,497, 5,316,702, 5,358,672, 5,480,600, 5,512,371, 5,531,940, 5,702,819, and 5,793,465 incorporated herein in their entireties by reference.

Addition of vertical prism power into a lens may be accomplished using a variety of methods. The particular method used will depend upon the method desired to be used in manufacturing the lens. For example, for lenses in which surfacing is used to produce one or more of the lens surfaces, the added vertical prism power may be incorporated into the lens through the surfacing process, for instance and without limitation by using offset blocking techniques. As an alternative method, in lenses in which one or more of the surfaces, or the entire lens is cast, the molds used to cast the lens or surface may be tilted so as to add the vertical prism power. The power of the vertical prism added into the lens by such tilting will be approximately equal to the tilt of the mold surface to the preform surface. For example, one degree of tilt will equal about 1 diopter of added prism power. The direction of the tilt will determine whether the prism is base up or base down.

Figure 2:
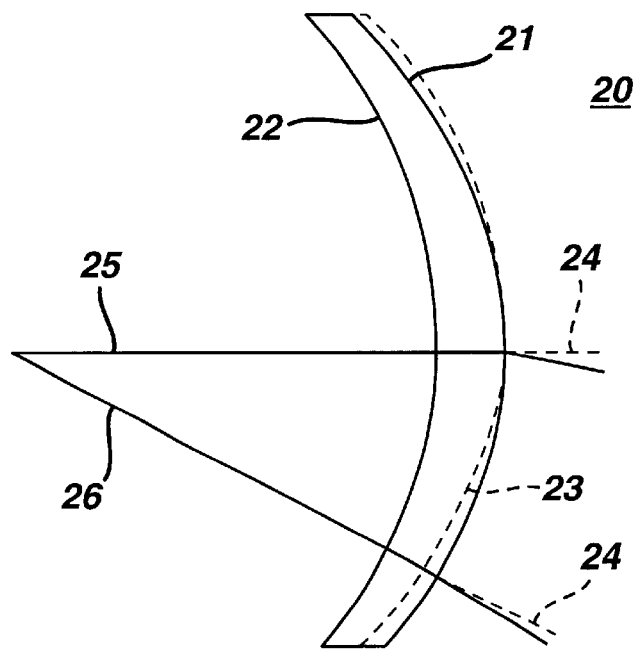
FIG. 2 is a magnified, cross-sectional view of the progressive addition lens of FIG. 1 into which prism power was added.

In FIG. 1 is shown progressive addition lens 10 of the prior art having the lens add power on the convex surface. The solid lines 11 and 12 indicate the ray traces for the distance and near vision lines of sight, respectively, and show how the objects viewed through the lens appear shifted due to the unprescribed vertical prism in the near vision zone arising from the higher surface curvature. As a reference, the dotted line 13 indicates the shape of a lens with zero add power (single vision lens) and the dotted line 14 shows the difference in the ray trace between the progressive and single vision lens. FIG. 2 shows a lens 20 that is a progressive addition lens with the add power on the convex surface. Dotted line 23 depicts the shape of the lens absent any added prism. Solid lines 21 and 22 depict lens 20 with the convex surface of the lens tilted to produce base down prism. The resultant shape of the lens and the ray traces 25 and 26 show how the objects viewed through the lens appear largely unshifted due to the lower unprescribed prism in the near vision zone.

In a preferred embodiment, an optical preform is used and onto at least one preform's surfaces is cast one or more layers. By "optical preform" is meant a shaped, optically transparent article capable of refracting light and possessing a convex and a concave surface, which article is suitable for use in producing a spectacle lens. Each of the optical preform and cast layer refractive powers may be a portion or all of the distance vision, near vision, intermediate vision, or cylinder refractive power, of the finished lens to be formed, or combinations thereof. Preferably, at least one surface of the optical preform is a progressive addition surface and the cast layer forms an additional progressive surface, most preferably formed on the preform's front surface.

Positioning of a mold and a preform so as to add the desired vertical prism power may be accomplished by use of any convenient positioning means such as a gimbal holder, a gripper, a vacuum gripper, or the like and combinations thereof. Preferably, positioning is accomplished by placing the mold, using positioning means such as suction, in a fixture capable of gimbaling action. The required mold displacement and tilt may be accomplished by any conventional displacement means, including, without limitation, servo motors.

Once the desired mold-preform orientation is achieved material for forming the cast layer is dispensed into the mold and cured to form the cast layer. Suitable materials for use in the process include, without limitation, those disclosed in U.S. Pat. No. 5,470,892, incorporated in its entirety herein by reference. Additional suitable monomers include, without limitation, allyl and bis(allyl) carbonates, such as diethylene glycol bis(allyl) carbonate, bisphenol A diallyl carbonate, and the like, acrylic acid, multi-functional acrylates and methacrylates, such as ethylene glycol diacrylate, tetraethylene glycol diacrylate, tripropylene glycol diacrylate, trimethylolpropane triacrylate, tetrahydrofurfuryl methacrylate, tetrahydrofurfuryl acrylate, hexanediolmethacrylate, methyl methacrylate, butyl methacrylate, propyl methacrylate, penterythritol tetraacrylate, urethane acrylates and methacrylates, styrene and styrene derivatives such as divinyl benzene, 4-vinyl anisole, various esters or maleic and itaconic acids, methacrylic and acrylic anhydrides and the like, and combinations thereof. Such monomers are commercially available or methods for their production are known. Materials suitable for use for the preform are those above-listed for use as spectacle lens material.

Curing of the dispensed material may take place by any conventional means including, without limitation, thermal cure, radiation cure, visible light cure, and combinations thereof. Preferably, ultra-violet cure is used, more preferably a two-stage UV cure in which the mold is exposed to low intensity and then high intensity ultraviolet light.

In another embodiment, the prism is introduced at the interface of two layers of a lens, each layer preferably being of a different refractive index. The amount of the prism may be one of constant over the entire lens area, have a constant value above the x-axis, have a different constant value below the x-axis, have a blended discontinuity across the x-axis, gradually change in a smooth, monotonic manner from the fitting point to the near vision zone of the lens, or combinations thereof. In embodiments in which the magnitude, or amount, of the added prism changes from the fitting point to the near vision zone, the change must be gradual so as to avoid introduction of unwanted astigmatism into the progressive addition channel. The magnitude of the added prism must take into account the refractive index difference between the two layers according to standard optical principles. Placing the prism at an internal interface is advantageous in that it permits independent control of the amount of prism in the distance and near viewing zones and simplifies the lens' manufacture.

The invention will be clarified further by a consideration of the following, non-limiting examples.

EXAMPLES

Example 1

Figure 3:
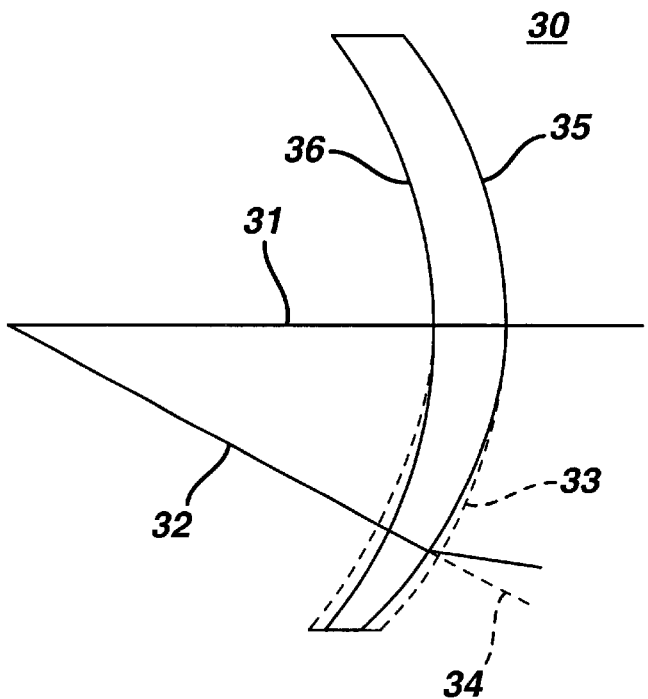
FIG. 3 is a magnified, cross-sectional view of a prior art progressive addition lens of Example 1.

In FIG. 3 is shown a progressive addition lens 30 having a portion of the total lens add power on the convex surface 35 and another portion on the concave surface 36. The lens of this example was formed by casting a progressive addition surface onto the convex surface of an optical preform. A lens having a total add power of 2.25 diopters was produced with the concave surface having an add power of 0.75 diopters and the convex surface an add power of 1.50 diopters. A lens with a total add power of 1.50 diopters was produced with the concave surface having an add power of 0.75 diopters and the convex surface an add power of 0.75 diopters. The solid lines 31 and 32 are the ray traces of the distance and near line of sight, respectively. Dotted line 33 depicts the shape of the lens in the case that the lens is a single vision lens and dotted line 34 shift in the ray trace for the single vision lens. Table 1 shows the horizontal and vertical prism powers of lenses such as lens 30 without added prism. For the 2.25 diopter add power lenses the unprescribed vertical prism in the near zone ranges between 0.65 and 1.12 base up prism diopters. For the 1.50 diopter add power lenses the unprescribed vertical prism in the near zone ranges between 0.49 and 0.59 base up prism diopters.

TABLE 1

| Add Power; Left or Right | Near Vision Zone Unprescribed Horizontal Prism; Direction | Near Vision Zone Unprescribed Vertical Prism; Direction | Distance Vision Zone Unprescribed Horizontal Prism; Direction | Distance Vision Zone Unprescribed Vertical Prism; Direction |
|---|---|---|---|---|
| 2.25 diopters Right | 0.05 D out | 1.12 D up | 0.12 D in | 0.92 D down |
| 2.25 diopters Left | 0.06 D in | 0.65 D up | 0.12 D in | 0.92 D down |
| 2.25 diopters Right | 0.10 D in | 1.06 D up | 0.14 D out | 0.57 D down |
| 2.25 diopters Left | 0.03 D in | 0.78 D up | 0.04 D out | 0.59 D down |
| 1.50 diopters Right | 0.18 D in | 0.49 D up | 0.16 D out | 0.35 D down |
| 1.50 diopters Left | 0.14 D in | 0.50 D up | 0.04 D out | 0.59 D down |
| 1.50 diopters Right | 0.05 D in | 0.59 D up | 0.45 D in | 0.37 D down |
| 1.50 diopters Left | 0.15 D in | 0.57 D up | 0.32 D out | 0.45 D down |

Figure 4:
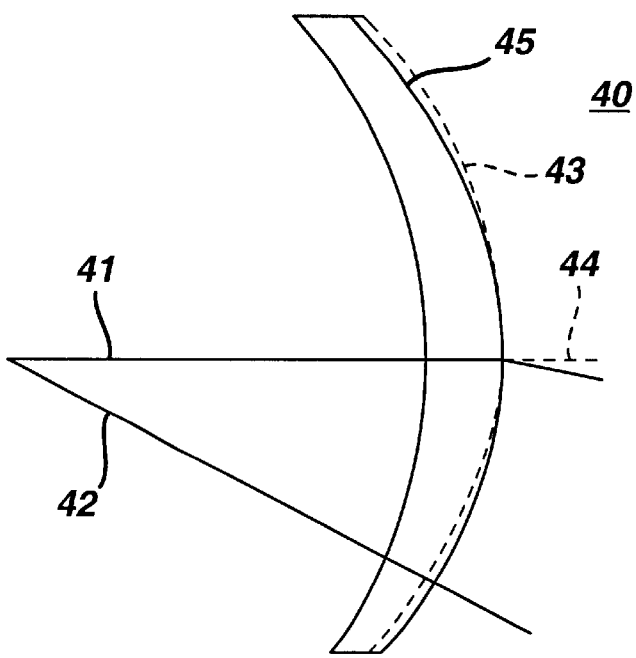
FIG. 4 is a magnified, cross-sectional view of the progressive addition lens of FIG. 3 of Example 1 into which prism power was added.

FIG. 4 shows progressive addition lenses 40 produced with convex surface 45 tilted to produce base down prism. These lenses were formed by casting a progressive addition surface onto an optical preform. Vertical prism was added to the lenses by tilting the glass mold used to cast the progressive addition surface B degrees in relation to the preform about the preform's x axis, given by the formula:

$$B = \{1/(n-1)\} \times \arctan(P/100) \quad (I)$$

where n is the refractive index of the cast layer and P is the introduced prism. A suitable casting resin was then added and the cured to form the lenses shown. The amount of vertical prism added was equal to half of the add power. For the 2.25 diopter add power lenses, approximately 1.12 diopters of base down prism were added. For the 1.50 diopter add power lenses, approximately 0.75 of base down prism was added. Solid lines 41 and 42 show the ray trace of the distance and near vision liens of sight, respectively, through the lens. Dotted line 44 depicts the ray trace absent addition of the prism.

In Table 2 is shown the lenses of Table 1 into which vertical prism power was added. As can be seen by a comparison of the tables, the near vision zone vertical prism power is reduced by the added prism power.

TABLE 2

| Add Power; Left or Right | Near Vision Zone Unprescribed Horizontal Prism; Direction | Near Vision Zone Unprescribed Vertical Prism; Direction | Distance Vision Zone Unprescribed Horizontal Prism; Direction | Distance Vision Zone Unprescribed Vertical Prism; Direction |
|---|---|---|---|---|
| 2.25 diopters Right | 0.05 D out | 0.01 D down | 0.12 D in | 2.04 D down |
| 2.25 diopters Left | 0.06 D in | 0.47 D down | 0.12 D in | 2.04 D down |
| 2.25 diopters Right | 0.10 D in | 0.06 D down | 0.14 D out | 1.69 D down |
| 2.25 diopters Left | 0.03 D in | 0.34 D down | 0.04 D out | 1.71 D down |
| 1.50 diopters Right | 0.18 D in | 0.26 D down | 0.16 D out | 1.10 D down |
| 1.50 diopters Left | 0.14 D in | 0.25 D down | 0.04 D out | 1.34 D down |
| 1.50 diopters Right | 0.05 D in | 0.16 D down | 0.45 D in | 1.12 D down |
| 1.50 diopters Left | 0.15 D in | 0.18 D down | 0.32 D out | 1.20 D down |

Example 2

Figure 5:
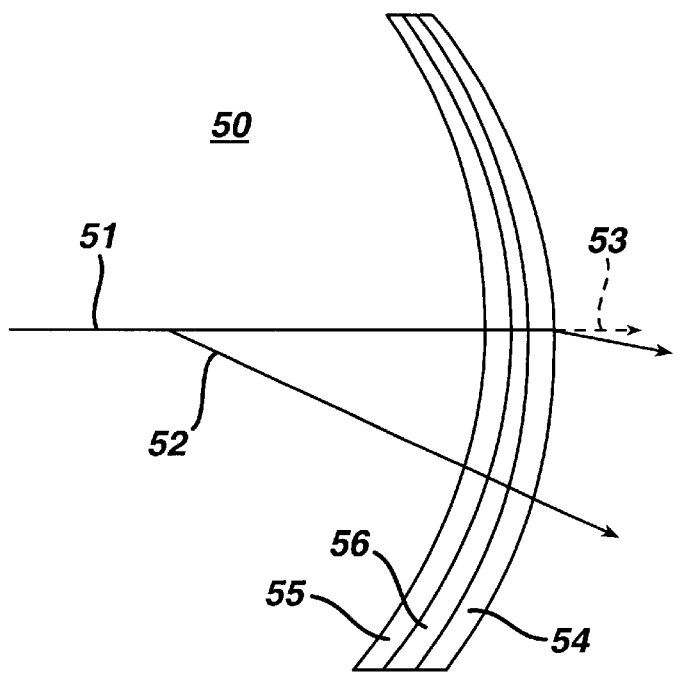
FIG. 5 is a magnified, cross-sectional view of a progressive addition lens into which a uniform prism power was added at the interface.

In FIG. 5 is depicted a lens 50 in which there is introduction of a uniform magnitude of base down prism at an interface of two surfaces 54 and 55 of the lens, one surface being made from a material of a refractive index of 1.60 and the other of 1.50. The convex surface 54 of the lens has a distance zone curvature of 6.00 diopters and near zone curvature of 7.00 diopters. The concave surface 55 distance zone has a curvature of 6.00 diopters and a near zone curvature of 5.00 diopters. The lens' distance power is 0.00 diopters and the add power is 2.00 diopters. The curvature of the interface 56 is 6.00 diopters and is tilted, relative to the convex surface by 6 degrees (D) to produce base down prism (P) over the whole lens of:

$$P = D \times \frac{(n_1 - n_2)}{(n_1 - 1)} = 1.00\ D$$

Solid lines 51 and 52 show the ray traces for the distance and near lines of sight, respectively through the lens and dotted line 53 depicts the ray trace absent the added prism.

Example 3

Figure 6:
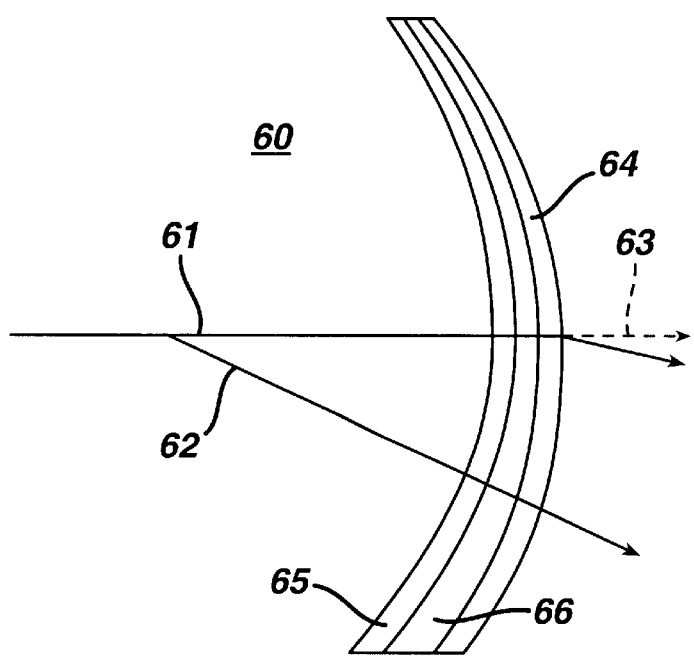
FIG. 6 is a progressive addition lens into which a graduated prism power was added at the interface.

In FIG. 6 is illustrated a lens 60 into which there is introduction of a gradually increasing magnitude of base down prism at the interface between two surfaces 64 and 65 of the lens, the surface being made from materials of 1.60 and 1.50 refractive indices. The convex surface 64 of the lens has a distance zone curvature of 6.00 diopters and a near zone curvature of 7.00 diopters. The concave surface 65 distance zone curvature is 6.00 diopters and it has a near zone curvature of 5.00 diopters. The lens' distance power is 0.00 diopters and the add power is 2.00 diopters. The curvature of the interface 66 in the distance zone from the fitting point and above (y>0 mm) is 6.00 diopters and is parallel to the convex surface in the zone. This introduces no prism at the fitting point. The curvature below the top of the near zone (y<−15 mm) is 6.00 diopters and tilted, relative to the convex surface, by 6 degrees introducing base down prism in the near zone of:

$$P = D \times \frac{(n_1 - n_2)}{(n_1 - 1)} = 1.00 \ D$$

The interface curvature between the fitting point and the top of the near zone (o>y>−15 mm) is smoothly blended to the curvature above and below these coordinates in such a manner as to minimize visual disturbances. Solid lines 61 and 62 show the ray traces for the distance and near lines of sight, respectively through the lens and dotted line 63 depicts the ray trace absent the added prism.

What is claimed is:

1. A progressive addition lens comprising an add power, a near vision zone vertical prism having a power and a base, and a vertical prism having a power and a base added to substantially the whole lens, wherein the added vertical prism base is opposite in direction to the near vision zone vertical prism base and the added vertical prism power is equal to about 0.25 percent of the add power.

2. The lens of claim 1, wherein the lens further comprises an optical preform comprising a progressive addition surface.

3. The lens of claim 2, further comprising a progressive addition surface cast onto the optical preform.

4. A pair of progressive addition lens, comprising: a.) a first lens comprising a first add power, a first near vision zone vertical prism having a power and a base, and a first vertical prism having a power and a base added to substantially the whole lens; b.) a second lens comprising a second add power, a second near vision zone vertical prism having a power and a base, and a second vertical prism having a power and a base added to substantially the whole lens; wherein the first and second added prism base each are opposite in direction to the near vision zone vertical prism base to which it is added, the added vertical prisms each is equal to about 0.25 percent of the add power of the lens to which it is added, and there is a difference between the vertical prism at any point on the first lens and a corresponding point on the second lens equal to or less than about 0.5 diopters.

5. The lens pair of claim 4, wherein at least one of the first or second lens further comprises an optical preform comprising a progressive addition surface.

6. The lens pair of claim 5, wherein at least one the first or second lens further comprises a progressive addition surface cast onto the optical preform.

7. A method for manufacturing a progressive addition lens comprising the steps of:

a.) providing a lens comprising an add power, a near vision zone vertical prism having a power and a base; and b.) adding to substantially the whole lens a vertical prism having a power and a base, wherein the added vertical prism base is opposite in direction to the near vision zone vertical prism base and the added vertical prism power is equal to about 0.25 percent of the add power.

8. The method of claim 7, wherein step b.) is carried out by surfacing, casting, or combinations thereof.

9. A method for manufacturing a progressive addition lens comprising:

a.) providing an optical preform comprising an add power, a near vision zone, and a near vision zone vertical prism having a power and a base; and b.) casting onto substantially whole of at least one surface of the preform a layer comprising a vertical prism having a power and a base, wherein the added vertical prism base is opposite in direction to the near vision zone vertical prism base and the added vertical prism power is equal to about 0.25 percent of the add power.

10. The method of claim 9, wherein each of the optical preform, the cast layer, or both further comprises a portion or all of the distance vision, near vision, intermediate vision, or cylinder refractive power, of the finished lens to be formed, or combinations thereof.

11. The method of claim 9, wherein at least one surface of the optical preform is a progressive addition surface and the cast layer forms an additional progressive surface.

12. The method of claim 9, wherein the cast layer is cast onto the preform's front surface.

* * * * *